Oct. 31, 1961 G. A. WAPLING ET AL 3,006,521
TAPE HANDLING MECHANISM
Filed Nov. 24, 1959
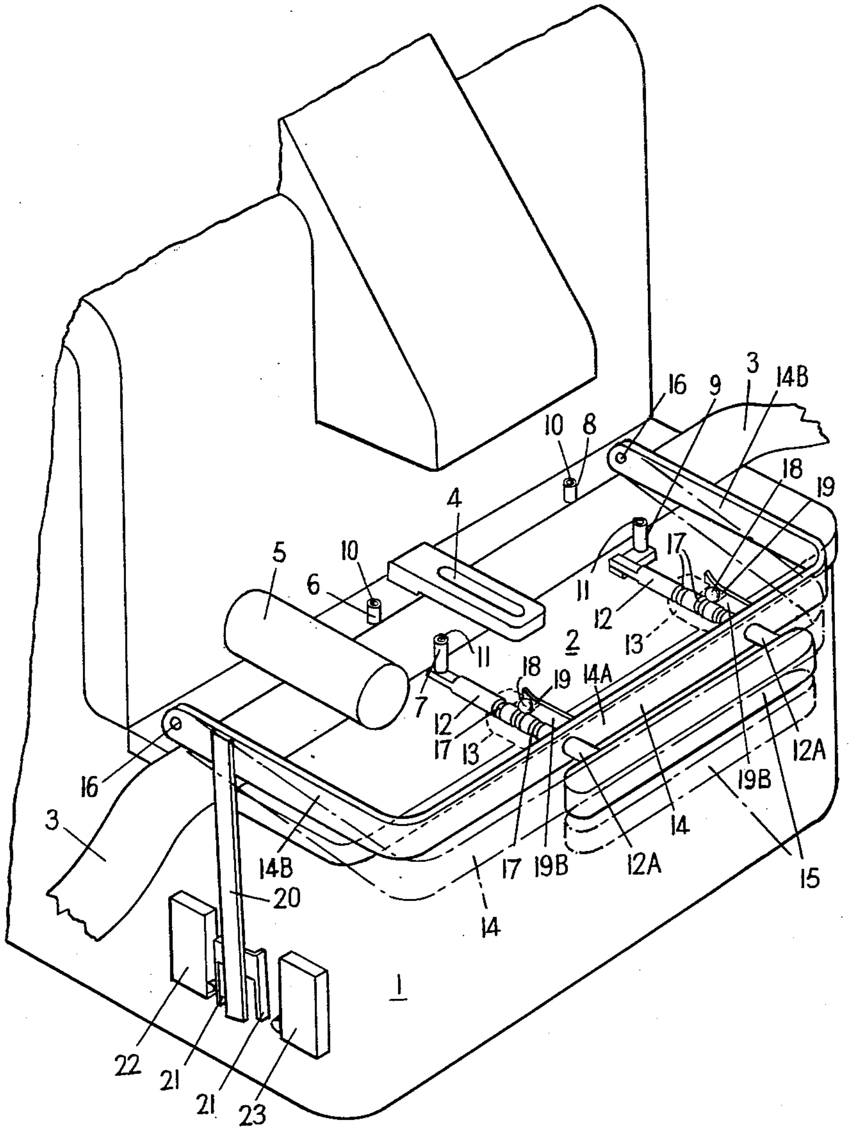
*George A Wapling*
*Eugene Donetti*
INVENTORS
BY *Burns, Doane, Benedict & Irons*
ATTORNEY United States Patent Office 3,006,521

Patented Oct. 31, 1961

3,006,521

TAPE HANDLING MECHANISM

George Archibald Wapling, East Sheen, and Eugene Donetti, Wembley, England, assignors to Associated Automation Limited, London, England, a British company Filed Nov. 24, 1959, Ser. No. 855,173
Claims priority, application Great Britain Nov. 26, 1958
8 Claims. (Cl. 226—174)

This invention relates to tape handling mechanism and "tape" includes for example punched tape, as used in reading, verifying or perforating machines, punched cards, magnetic tape, and generally any flat material which has to be moved and which has to be guided accurately at the edeg or edges. In this specification, for convenience, the invention will be described only as it applies to punched tape, but it should be understood that the invention can be applied to other materials, as mentioned above.

Punched tape is widely used for supplying information to electronic apparatus, for instance to computers, and because of the high speed at which the tape has to be moved, it has to be guided at its edges. One known tape guiding mechanism has two pairs of guiding rollers, the pairs being spaced apart, one pair at each side of the information reading position. Each pair has a fixedly mounted roller for guiding one edge of the tape and a movably mounted roller for guiding the other edge. The movably mounted rollers are movable either vertically upward into position against the edge, or vertically downward away from that position to allow the tape to be removed or inserted. The disadvantage of this known mechanism is that, when the rollers are moved, they can damage the tape. Another known construction provides for one roller of each pair to be movable, not for the purpose of removing or replacing the tape, but for moving the roller to one of two positions so that the mechanism may be adjusted to take either of two different width tapes. With this mechanism the tape cannot readily be removed or replaced without moving other associated parts of the mechanism.

An object of the invention is to provide mechanism which will allow the tape to be easily removed or replaced without damage to the tape and without moving other associated parts.

According to this invention tape handling mechanism comprises pairs of spaced, tape edge guiding members, and a movable mounting for at least one of each pair of guiding members, the motion of the said one movable mounting having horizontal and vertical components, whereby the member carried by the said one movable mounting may be moved laterally and downwardly from a tape engaging position to a retracted position.

Also according to this invention tape handling mechanism preferably comprises pairs of spaced rollers, each pair having a fixedly mounted roller for guiding one tape edge and a movably mounted roller for guiding the other tape edge, the movably mounted rollers each being mounted for moving laterally and downwardly from a vertical tape edge engaging position into a retracted position, and for moving from the retracted position laterally and upwardly into the engaging position. With this arrangement, when the movably mounted rollers are in the retracted position, they are sufficiently to one side and lowered, in relation to the tape, that it can easily be removed laterally and over the lowered rollers. Replacement of the tape is similarly an easy matter. When the rollers are moved their movement is lateral in relation to the tape so that the tape cannot be damaged. Preferably the mountings of the movably mounted rollers are arranged to be held in any one of several positions, for different tape widths. For whatever width the mountings are set, the same retracting or engaging action takes place.

One embodiment of the invention will now be described as an example, with reference to the accompanying drawing, which is a perspective view of the tape handling mechanism as applied to a high speed tape reader, which is shown only in outline, as it forms no part of the invention.

In the drawing a tape reader casing 1 has a platform 2 over which a punched tape 3 passes a reading or scanning position 4. The tape is driven by a pair of drive rolls, one of which, the upper roll, is indicated at 5.

Two pairs of spaced rollers 6, 7 and 8, 9 guide the tape. Rollers 6 and 8 are journalled on fixed, vertical mounting pins 10, whilst rollers 7 and 9 are journalled on movable mounting pins 11. The movable mounting pins 11 are carried on the inner end of a pair of parallel, horizontal arms 12, each arm 12 being slidably carried in a tubular mounting 13 (shown dotted) and the tubular mountings 13 being fixed at their outer ends to a swinging frame 14. The arms 12 project outwardly at 12A beyond the mountings and the frame 14 and at their ends are fixed to a common handle 15, which can be manually depressed, so that the frame, mountings, arms and rollers move in unison.

The frame has a central portion 14A parallel to the direction of tape travel and at right angles to the mountings and arms, and two inwardly extending side portions 14B, at right angles to the front portion. At their inner ends these side portions are pivotally mounted at 16 in a common horizontal pivotal axis, so that the frame may be moved about the axis when the handle is moved up or down. The upper position is the normal state. (The lower position is shown dotted.) The location of the pivotal axis is such that, when the handle is depressed, the movably mounted rollers 7 and 9 are swung away from contact with the tape edge, their movement having horizontal and downward components, so that not only are they moved laterally away from the tape edge, but downwardly so that their tops are below the horizontal plane of the tape. This means that the tape can be easily withdrawn laterally without interference by the rollers 7 and 9.

A further advantage of laterally moving rollers is that their location can be so arranged as to "nip" the tape slightly when they are in the tape engaging position. It has been found that a small amount of "nip" (that is, an inward, lateral pressure against the tape) is beneficial to high speed tape travel.

It has been said above that the movable rollers can be adjusted for different tape widths. This is achieved in the following way.

Each arm 12, where it passes through its tubular mounting 13, has say three circumferential grooves 17, the grooves being spaced apart a short distance. Each mounting 13 carries a detent ball 18 in a bore 19 and urged into contact with the arm 12 by a leaf spring 19, and the ball can engage one of the grooves and so hold the arm in a particular adjusted position. By pulling or pushing the handle the arms can be moved against the spring-pressed balls, until the balls locate in the appropriate pair of grooves. The spacing and position of the grooves correspond to the desired position of the movable rollers according to the widths of tape to be used.

Preferably one frame side portion 14B has a depending arm 20 which carries two operating members 21 for micro-switches 22 and 23, so that the usual tape drive and brake can be synchronously operated with the movably mounted rollers 7 and 9.

What is claimed is:

1. Tape handling mechanism comprising pairs of spaced, tape edge guiding members, and a movable mounting for at least one of each pair of guiding members, the motion of the said one movable mounting having horizontal and vertical components, whereby the member carried by the said one movable mounting may be moved laterally and downwardly from a tape engaging position to a retracted position.

2. Tape handling mechanism having pairs of spaced, tape edge guiding rollers, each pair having a fixedly mounted roller for guiding one tape edge and a movably mounted roller for guiding the other tape edge, the movably mounted rollers each being so mounted that its motion has horizontal and vertical components, whereby the movably mounted rollers may be moved laterally and downwardly from a tape engaging position to a retracted position.

3. Mechanism according to claim 1 including means for varying the spacing between the members of each pair of spaced guiding members.

4. Mechanism according to claim 2 wherein the movably mounted rollers are mounted on arms, the arms being slidably carried by a frame.

5. Mechanism according to claim 4 wherein the arms have two or more grooves and the frame has spring pressed groove-engaging means, whereby the arms and rollers may be held in the desired position according to the tape width.

6. Mechanism according to claim 4 wherein the frame is rockably mounted on pivots in the tape handling mechanism, the pivotal axis of the pivots being such that downward rocking of the frame causes the movably mounted rollers to move laterally and downwardly from the tape engaging position to the retracted position.

7. Mechanism according to claim 1 wherein the spacing of the members of each pair of members in such that the members nip the tape when they are guiding the tape edges.

8. Mechanism according to claim 2 wherein the spacing of the rollers of each pair of spaced rollers is such that the rollers nip the tape when they are in the tape engaging position.

References Cited in the file of this patent

UNITED STATES PATENTS

| | | |
|---|---|---|
| 2,174,194 | Nemnich | Sept. 26, 1939 |
| 2,479,949 | MacPleat | Aug. 23, 1949 |
| 2,657,879 | Pike | Nov. 3, 1953 |
| 2,726,859 | Dolamore | Dec. 13, 1955 |
| 2,797,090 | Tholstrup | June 25, 1957 |